United States Patent [19]

Pinder

[11] Patent Number: 5,320,475
[45] Date of Patent: Jun. 14, 1994

[54] RETRIEVER AND CART FOR HANDLING HEAVY CONTAINERS

[76] Inventor: Stanley N. Pinder, 4124 Alatia Blvd., Brandon, Fla. 33511

[21] Appl. No.: 794,547

[22] Filed: Nov. 19, 1991

[51] Int. Cl.⁵ .............................................. B65G 67/02
[52] U.S. Cl. .................................... 414/343; 414/389; 414/421; 414/467; 414/498; 414/529
[58] Field of Search .............. 414/334, 340, 341, 343, 414/362, 373, 389, 401, 467, 469, 498, 408, 421, 454, 453, 529, 704

[56] References Cited

U.S. PATENT DOCUMENTS

| | | | |
|---|---|---|---|
| 2,650,834 | 9/1953 | Coval | 414/457 X |
| 2,904,201 | 9/1959 | Rhodes | 414/467 |
| 3,561,621 | 2/1971 | Rivers, Jr. | 414/467 X |
| 3,799,379 | 3/1974 | Grether et al. | 414/467 |
| 4,061,237 | 12/1977 | Austin et al. | 414/467 |
| 4,106,648 | 8/1978 | Dickson | 414/453 X |
| 4,155,471 | 5/1979 | Yancy | 414/469 X |
| 4,266,795 | 5/1981 | Walker | 414/467 X |
| 4,306,830 | 12/1981 | le Duc | 414/343 |
| 4,826,474 | 5/1989 | Holmes | 414/340 X |
| 5,078,560 | 1/1992 | Patrick et al. | 414/704 X |

Primary Examiner—Michael S. Huppert
Assistant Examiner—James T. Eller, Jr.
Attorney, Agent, or Firm—Joseph C. Mason, Jr.; Ronald E. Smith

[57] ABSTRACT

A retriever and a cart that are detachably secured to one another are used for retrieving and transporting, respectively, heavy containers of the type found in trash compactors. A pair of biased looking bolts hold the retriever and container together when they are in repose. The locking bolts are retracted by squeezing a latch release handle positioned just below the retriever handle so that the cart and retriever can be easily separated from one another. The cart has curved leading surfaces so that the two parts can be reattached by simply pushing them together; the curved surfaces drive the locking bolts into their respective retracted positions so that the latch release handle need not be activated during the reattachment procedure. Another biased latch holds the retrieved containers onto the retriever and is released upon activation of a foot-operated pedal; the pedal is biased and specifically configured so that attachment of the retriever and container is accomplished in the absence of foot pedal operation. The container itself is specifically configured so that tightly compacted trash falls out of it when it is inverted, and the cart is specifically configured so that it retains the containers when it is inverted. A trash receptacle having the capacity to similarly retain a plurality of containers when inverted is also provided.

12 Claims, 10 Drawing Sheets

RETRIEVER AND CART FOR HANDLING HEAVY CONTAINERS

BACKGROUND OF THE INVENTION

1. Field of the Invention

This invention relates, generally, to the waste disposal industry. More particularly, it relates to a cart having a detachable part for retrieving heavy containers from trash compactors and depositing them on the cart.

2. Description of the Prior Art

A small, refrigerator-size trash compactor was invented by the present inventor about eighteen years ago to fill a need in the convenience store industry. A similar compactor is now in use in the medical field; it is used in many hospitals. Typically, a single hospital will have a plurality of the compactors positioned in convenient locations throughout the facility such as in storage closets and other waste staging areas.

Although compactors fill a longstanding need, they have a few shortcomings. For example, most use a cardboard box supported by the floor of the compactor to hold the compacted waste materials, and no means are provided to facilitate emptying of the box when it is full; accordingly, the box is simply disposed of with its contents. A cardboard box full of compacted waste materials weighs about one hundred pounds, and due to its cubic configuration, it is difficult to lift and handle, creating obvious occupational hazards. Orderlies and janitors have responded to this shortcoming by retrieving the box for subsequent disposal when it is only about half full, thereby saving them the strain of lifting a hundred pound load. This practice wastes cardboard, obviously, by using about twice as much cardboard as should be used. Since it takes about seventeen fully grown, thirty five year old trees to produce a ton of cardboard, the need to avoid such waste is compelling.

The current premature and too-frequent unloading process also wastes man-hours. Even When a waste container has been prematurely unloaded, it still must be carried or transported by some means to a disposal area; presently, no satisfactory means are provided whereby the individual charged with the unloading task can unload several compactors and take a plurality of containers to the disposal area in one trip. Moreover, handling of cardboard boxes full of hospital waste is contraindicated due to the risk of puncturing a hand by an improperly disposed of needle. Finally, back injuries may be sustained by those required to lift the containers from the compactors.

Thus, there is a need for a container-retrieval means that would obviate the need for manual lifting of the containers so that the containers could be allowed to be filled to their designed capacity before removal from the compactor. Such a means would benefit the environment by reducing demand for mature trees, would reduce the man-hours required to service the compactors, and would prevent accidental punctures by improperly discarded needles.

Moreover, there is a need for a container not made from corrugated paper. An improved container would completely eliminate the need to fell trees to make waste containers. The ideal container would not only be made of a different material, it would also be reusable. However, since the trash is tightly compacted in the container, and therefore not easily dumped therefrom, the problem cannot be solved just by substituting a different material for the corrugated paper.

The needed retrieval means should also be simple to operate so that it will be used. Numerous mechanically complex mechanisms could be designed to accomplish the needed retrieval, but there is a need for an elegant, low maintenance, rugged, no-training-required apparatus that accomplishes the job effectively. However, the prior art, when considered as a whole in accordance with the requirements of law, neither teaches nor suggests how the present manual retrieval system could be improved by an apparatus that fills these stringent but desirable requirements.

SUMMARY OF THE INVENTION

A novel container that obviates the need for corrugated containers of the type now in use in small trash compactors of the type described hereinabove is removed from a compactor by a novel retriever that is detachable from a cart that can transport a plurality of the novel containers. Use of the retriever eliminates the need to lift the container when it is removed from the compactor; moreover, there is no lifting required to transfer the container from the retriever to the cart. This encourages the service personnel charged with removing the containers to allow them to be completely filled before removal, thereby achieving the important objectives of reducing the risk of back injury during the retrieval process and of increasing productivity.

The novel container is made of elastomeric materials and is reusable, thereby accomplishing the further important objective of reducing the demand for corrugated paper. The shape of the container is novel as well; its unique configuration enables tightly compacted trash to be easily dumped therefrom when the container is inverted.

The novel retriever is releasably attachable to the novel cart; the cart has a predetermined length that will accommodate a plurality of the novel containers so that a single trip to the disposal area transports a plurality of said containers, thereby increasing the productivity of those assigned to the disposal task.

The bed of the cart includes a novel means that engages and retains the bottom of each container as it is rolled onto said bed so that the bed and hence the containers thereon may be inverted to dump the contents of the containers; the retainer means ensures that the container members will not fall into the receptacle that receives the compressed trash.

The retriever is releasably attached to the cart and means are provided to enable quick attachment and detachment of said retriever. The retriever is detached from the cart when a container is to be retrieved from the compactor and delivered to the cart. Transportation of the retriever while it is detached from the cart is facilitated by an extra set of wheels that do not engage the floor when the retriever is attached to the cart; when the retriever is detached, it is tilted back so that the auxiliary wheels engage the floor in cooperation with the primary wheels, and the retriever in that position is transportable over a support surface just as if it were a cart.

An upwardly projecting protuberance on the cart engages a notch on the underside of the retriever to form a pivot point about which the retriever is rotated when it is reattached to the cart. The pivot point is positioned so that the pivot action is accomplished in the absence of substantial exertion by the individual performing the procedure.

The retriever further includes a locking and unlocking mechanism that enables it to engage a container or tote to withdraw it from a compactor and to release the tote onto the cart. The mechanism includes a biased latch that automatically engages a tote when the retriever is pushed against it; the operator of the retriever steps on a foot plate to release the tote after it has been transported to and loaded on the cart Another latch mechanism automatically attaches the retriever to the cart when the latter is pushed into the former. A latch release handle is connected to a dead bolt member that is biased to interlock the retriever and cart when it is in repose; the cart has a pair of curved surfaces which drive the bolt into its retracted position momentarily when the retriever and cart are reattached to one another; accordingly, the retriever operator need not operate the latch release handle when the retriever is being reattached to the cart. When the reattachment is complete, the bias means returns the dead bolt to its cart/retriever interlocking position of repose. Detachment of the cart and receiver is accomplished by manipulating the latch release handle to overcome the bias and retract the dead bolt momentarily.

The primary object of this invention is to provide an inexpensive but effective means for unloading containers full of compacted waste materials from a compactor with a minimum amount of effort by the individual charged with the task.

A more general object is to eliminate usage of corrugated containers in trash compactors.

Another object is to increase productivity by removing the incentive to perform too-frequent unloadings of such compactors.

Still another object is to eliminate the unsafe handling of compacted trash containers that might contain objects that threaten the health of the individuals handling such containers.

Another object is to eliminate liquid spills of infectious waste from leaking corrugated boxes.

These and many other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

Similar reference numerals refer to similar parts throughout the several views of the drawings.

DETAILED DESCRIPTION OF THE PREFERRED EMBODIMENT

Figure 1:
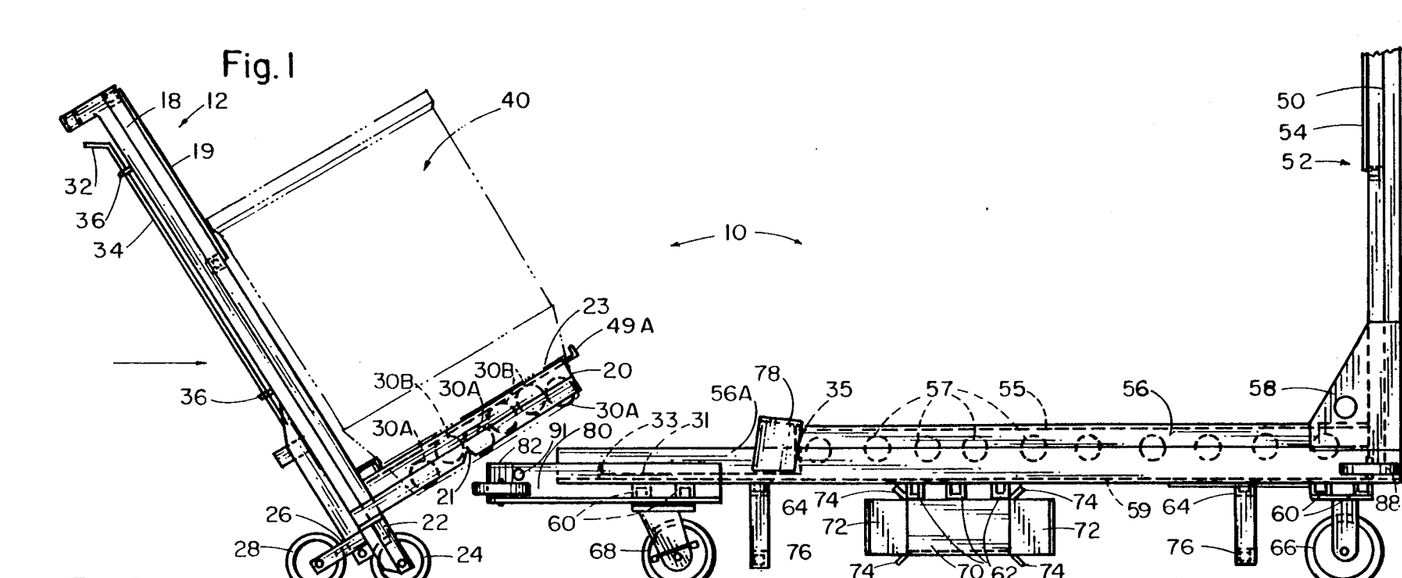
FIG. 1 is a side elevational view showing the novel retriever in its tote-carrying position as it approaches the novel tote cart.
Figure 2:
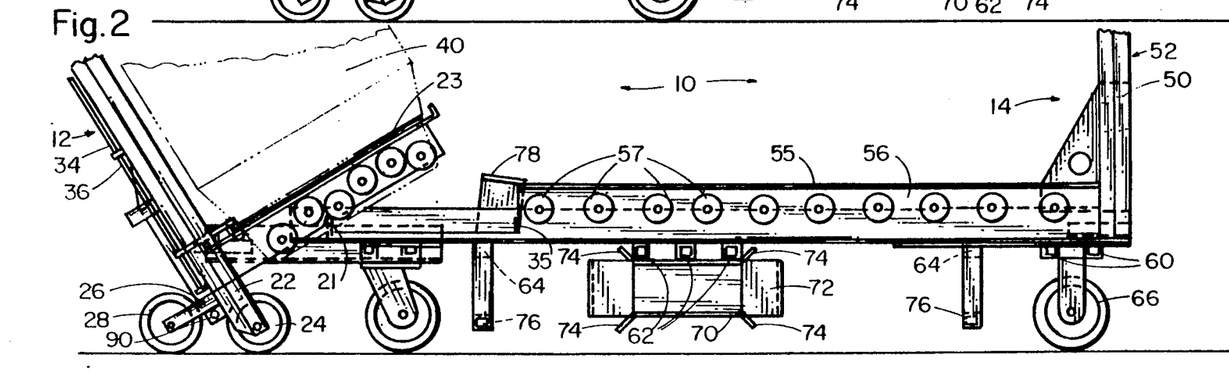
FIG. 2 is a side elevational view similar to FIG. 1, but showing the retriever disposed in pivotal engagement to the cart.
Figure 3:
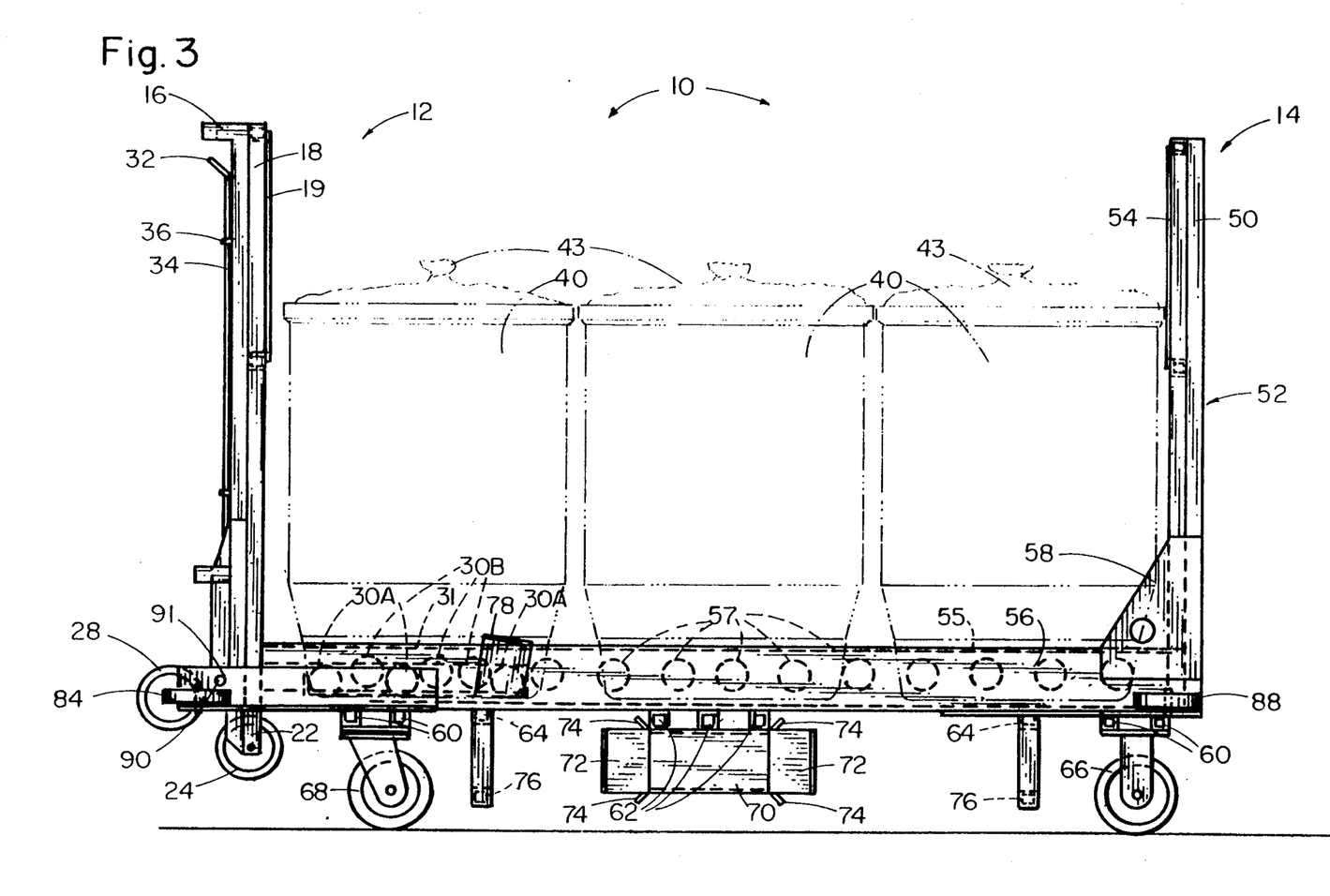
FIG. 3 is a side elevational view showing the retriever and cart in their interlocked position.

Referring now primarily to FIGS. 1-3, it will there be seen that the retriever and cart are denoted generally by the reference numeral 10; the retriever is denoted 12 as a whole and the cart is denoted 14 as a whole. As a unit, the retriever and cart are known commercially under the trademark Trashporter.

Figure 10:
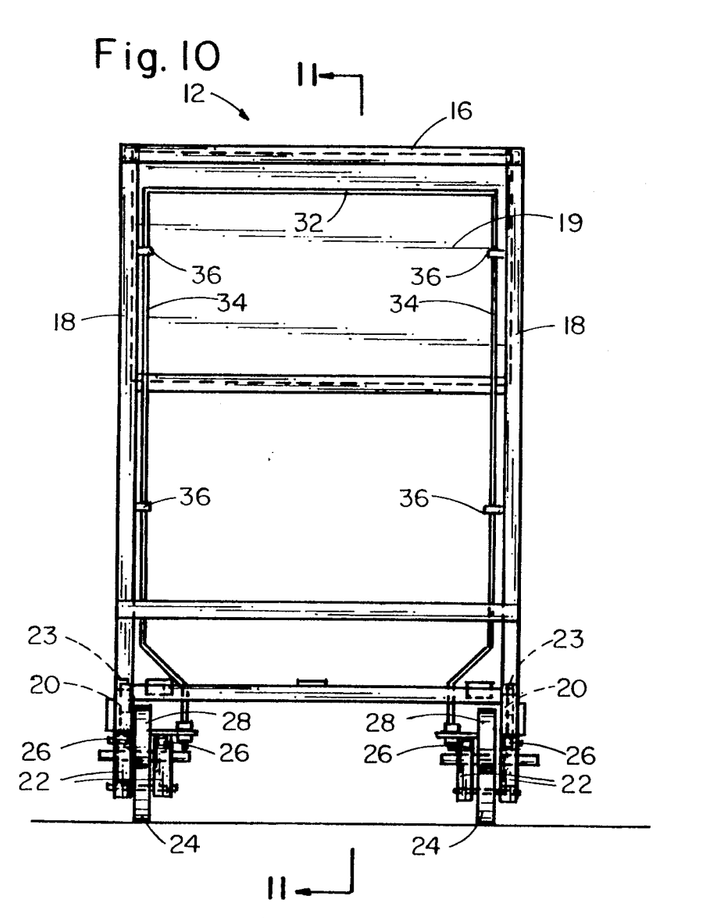
FIG. 10 is an end elevational view of the retriever.
Figure 11:
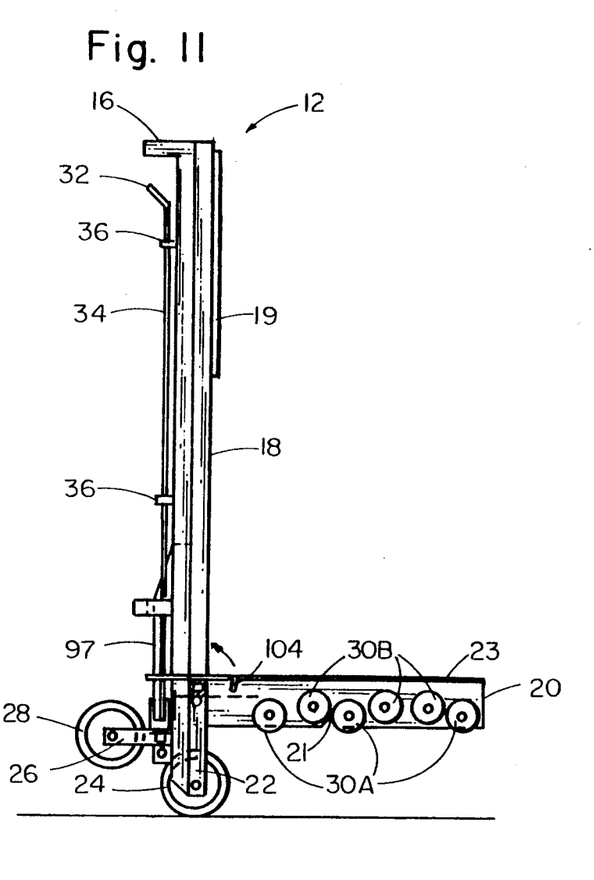
FIG. 11 is a sectional view of the retriever taken along line 11—11 in FIG. 10.

Retriever 12 includes transversely disposed handle 16 (see FIG. 10) which is supported at its opposite ends by upstanding handle supports 18, 18. A pair of transversely spaced, forwardly extending arms 20 (FIG. 16) are fixedly secured to and extend orthogonally from said supports, just above the lowermost ends of said supports. Supports 18, 18 and arms 20, 20 cooperate to support a trash container or tote 40 as is perhaps best shown in FIG. 1.

Primary caster wheels 24, 24 are rotatably mounted to the forked lowermost ends 22, 22 of supports 18, 18, and a pair of auxiliary caster wheels 28, 28 are rotatably mounted to forks 26, 26 that extend orthogonally relative to forks 22, 22 in trailing relation to retriever 12.

Arms 20, 20 serve further as a mounting means for a plurality of roller members that are rotatably mounted on the respective inboard sides thereof. A first, lower set of rollers is collectively denoted 30A, and a second, upper set of rollers is collectively denoted 30B. The function of these rollers is to slightly lift a tote (container) from the floor of a compactor when retriever 12 is used to perform the function its name expresses and to enable rolling engagement of the totes with respect to the retriever as better understood in connection with FIG. 18 and as will be more fully set forth hereinafter.

A cart latch release handle 32 is positioned just below retriever handle 16, in parallel relation thereto; it is supported at its opposite ends by support legs 34, 34. Support legs 34, 34 are slidably received within positioning brackets 36, as perhaps best understood in connection with FIG. 10; note that brackets 36 are mounted on supports 18, 18. To release the retriever 12 from cart 14, the operator squeezes handle 32 towards handle 16, and support legs 34, 34 slide upwardly within said brackets 36; this action overcomes the bias on a biased locking bolt that interconnects the retriever and cart when it is in repose, as will be more fully set forth in connection with FIGS. 14 and 15.

Figures 4, 5:
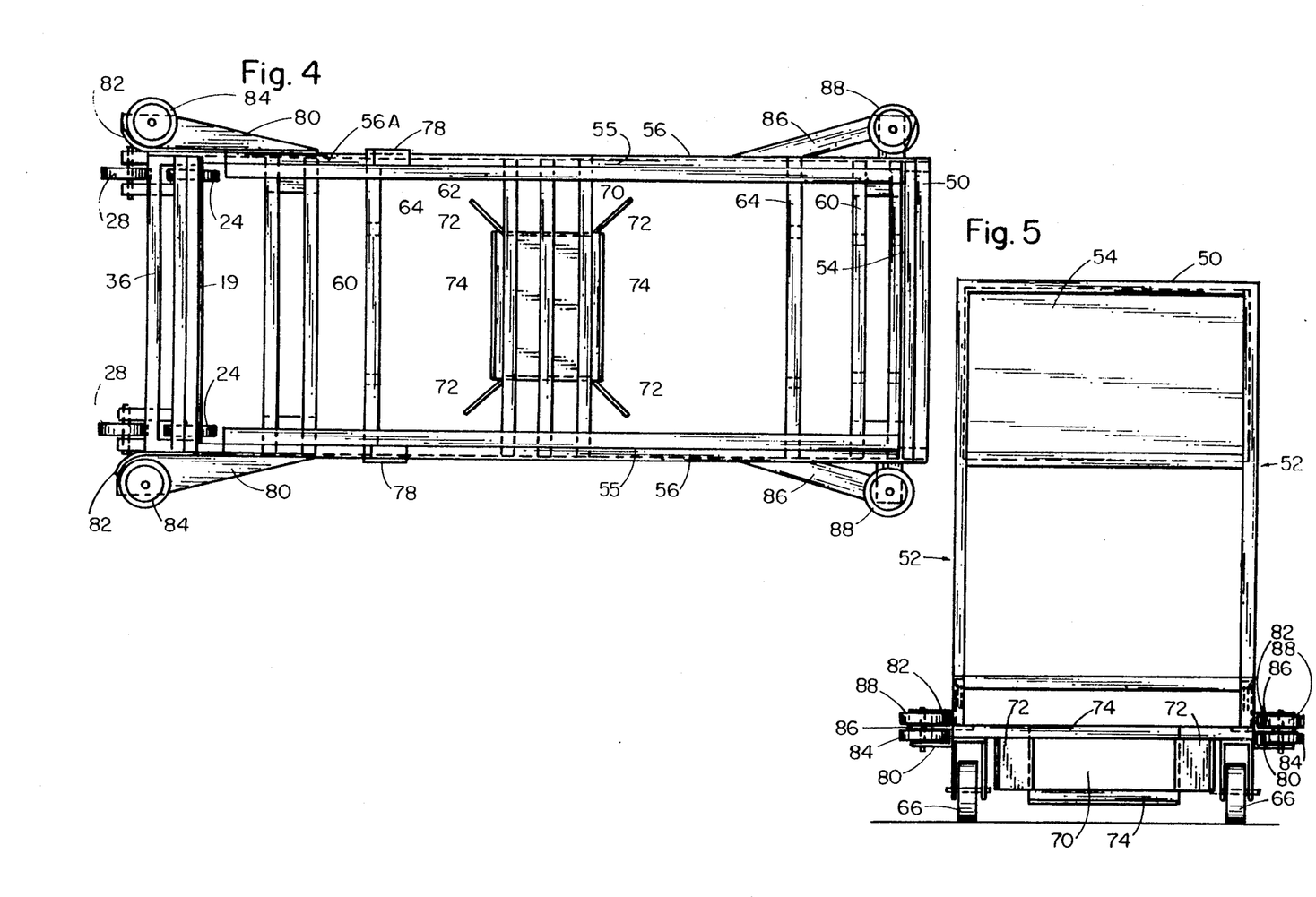
FIG. 4 is a top plan view of the cart.
FIG. 5 is an end view of the cart.

Referring now primarily to FIGS. 4 and 5, it will there be seen that cart 14 includes an upstanding forward end frame member that is formed by horizontal members 50 and supports 52 that depend from opposite ends thereof; a face plate 54 covers an opening framed by the upper part of said frame member.

Cart 14 further includes a horizontal bed or carriage that includes longitudinally disposed, transversely spaced apart frame members 56, 56. Braces 58, 58 (FIG. 3) interconnect said frame members 56 and the end frame assembly formed of parts 50 and 52. A plurality of longitudinally spaced, transversely disposed brace members 60, 62, and 64 interconnect frame members 56, 56, as perhaps best shown in FIG. 4. Forward carriage caster wheels 66 are fixed position wheels and are positioned below the forward brace members 60. The trailing caster wheels 68 are swivelly mounted and lockable and are positioned below the trailing brace members 60, as shown in FIG. 2.

Box 70 is fixedly secured to brace members 62 and depends therefrom as best shown in FIGS. 1 and 2; said box is open at its ends to receive the forks of a fork lift truck. Guide flanges 72, 72 guide the forks in a horizontal plane into either end of the box so that a fork lift operator may approach the cart from either direction and guide flanges 74, 74 guide the forks in a vertical plane into either end.

Additional box-like fork guides are denoted 76, 76; they are fixedly secured to and depend from brace members 64, 64.

Side frame members 56, 56 are I-beams; the top lip of each member 56 is denoted 55 and the bottom lip is denoted 59. A plurality of casters or skate wheels, collectively denoted 57, are rotatably mounted on the inboard side of each frame member 56, 56; the totes are rollable atop these casters.

A guide plate 78 is positioned at the retriever end of each side frame 56; its function is to guide side arms 20, 20 of the retriever 12 into mating relation to the side frame members 56, 56 when the cart 14 and retriever 12 are linked to one another.

The reference numeral 56A denotes that part of each frame member 56 that extends beyond its associated guide frame 78; said part will hereinafter be referred to as extension member 56A. An angle bracket 80 is fixedly secured to the outboard side of each extension member 56A; as perhaps best shown in FIG. 4, each angle bracket 80 flares laterally outwardly. A rubber caster wheel 84 is rotatably mounted about a vertical axis to the trailing or widest end of each bracket 80. The same arrangement is provided at the leading end of the cart 14 as well; at said front end, the brackets are denoted 86 and the caster wheels are denoted 88. Since wheels 84, 88 rotate about a vertical axis as aforesaid, they rotatably engage walls, doors, and the like if the cart is pushed carelessly through a building, and thereby prevent the cart from marring the objects against which the cart might otherwise scrape.

FIGS. 1 and 2 best depict the means by which the retriever 14 is connected to cart 12 in the absence of exertion by the individual pushing the retriever. A pivot point is provided by upstanding pintle 33 that is fixedly secured to the trailing end of a track 31 on the inboard side of extension member 56A, and a notch 21 engages said pintle as shown in FIG. 2 when the retriever is positioned as shown in said FIG. 2. The operator then lifts handle 16 gently so that the retriever rotates about said pivot point 33 as indicated by the single-headed directional arrows in FIG. 2; the rotation is easy even when the container 40 is full. After the rotation is completed, the retriever is pushed forwardly, i.e., from left to right in FIG. 2; the fully rotated and pushed forwardly retriever is depicted in FIG. 3. Wheels 30A rotatably engage track 31 and thus facilitate the forward shoving of the retriever. When the retriever is fully forward, its arms 20, 20 encounter their associated stop members 35, 35 at the leading end of their associated extension members 56A, 56A; this aligns each locking pin 90 (lower left corner of FIG. 2) and its associated locking hole 91 formed in vertical wall 82 of angle bracket 80 (FIG. 1); said pins are biased to enter their associated locking holes when aligned therewith, as will be set forth more fully hereinafter.

Figures 6, 7:
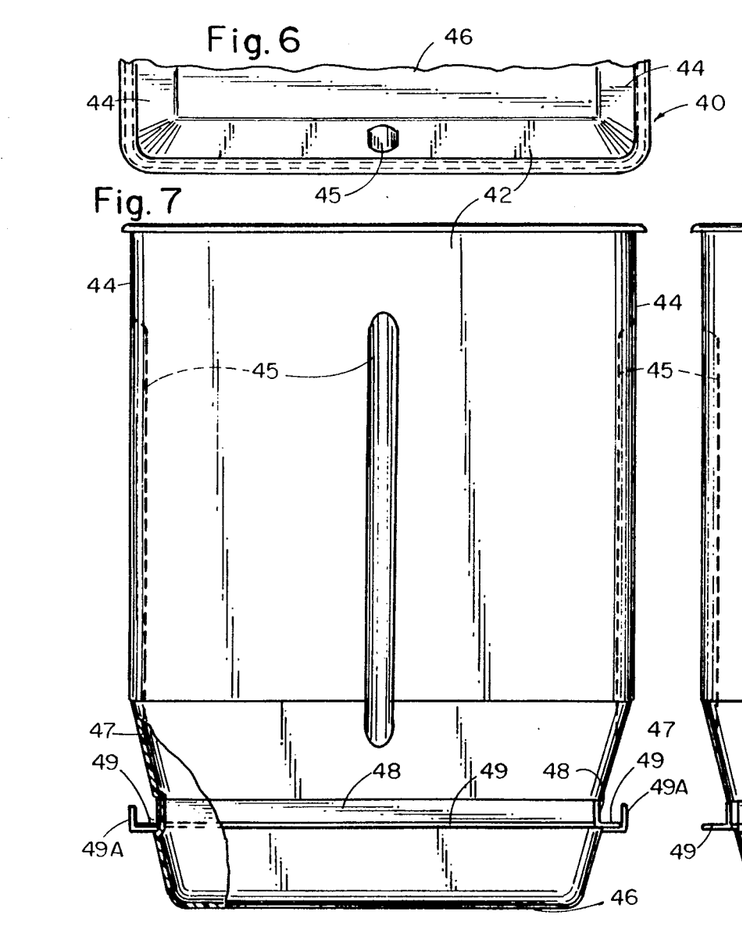
FIG. 6 is a broken away, partial top plan view of a tote.
FIG. 7 is a side elevational view of a tote.
Figure 8:
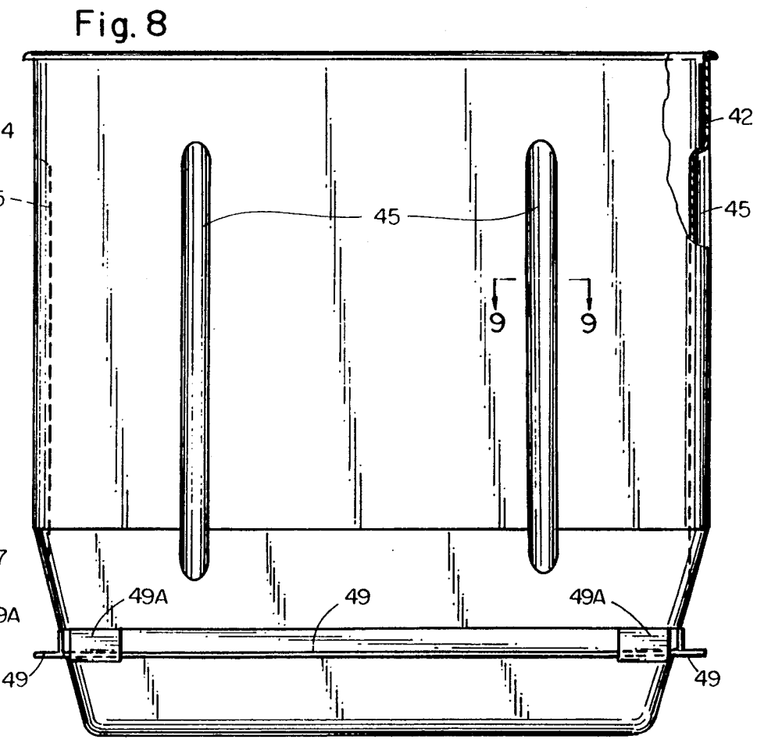
FIG. 8 is a front elevational view of a tote.
Figure 9:
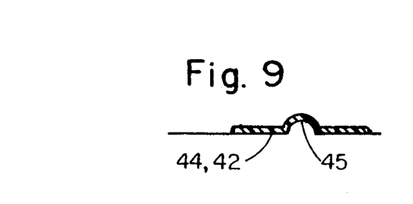
FIG. 9 is a sectional view taken along line 9—9 in FIG. 8.

Turning now to FIGS. 6–9, it will there be seen that the novel container or tote 40 includes an outwardly extending, downwardly curved lip 41 at its rim, side walls 42, front and back walls 44, and bottom wall 46. Elongate, vertically extending indentations or ribs 45 are formed in said walls. Preferably, as shown in FIG. 7, a single indentation 45 is centered in each side wall 42 and a pair of indentations 45 are formed in each front and back wall 44 on opposite sides of the center thereof in equidistantly spaced relation thereto. These ribs perform the function of preventing the creation of a vacuum between the plastic bags that line totes 40 and the inner surfaces of the walls 42, 44 when trash is tightly compacted into said bags.

The lower walls 47 of tote 40 taper inwardly as shown; this taper also insures that the plastic bag inserted in each tote 40 will separate therefrom when the tote is inverted.

A peripheral indentation or channel is formed in tapered lower walls 47 and a metal bracket 48 that circumscribes tote 40 is received therewithin. Bracket 48 includes a horizontal flat flange 49 that extends from both side walls and the front and back walls of the tote; the side wall-extending parts of flange 49 rides atop skate casters 30B of the retriever 12 and inboard skate casters 57 of cart 14 after the retriever has been pivoted about pintle 33. Horizontal flange 49 is slidingly received between the lips 23 and 55 of retriever side arms 20 and cart side frame members 56, respectively, i.e., said flange 49 is positioned slightly above lip 55 and slightly below lip 23 and is therefore captured therebetween when the tote is engaged by both the retriever and the cart (such as the tote at the left end of FIG. 3) so that tote 40 is retained against falling when the Trashporter is inverted. When the tote is rolled forwardly, i.e., away from the retriever end of the cart, each flange 49 slides under lip 55 of its associated cart side frame member 56 and is retained thereby when inverted.

Figure 12:
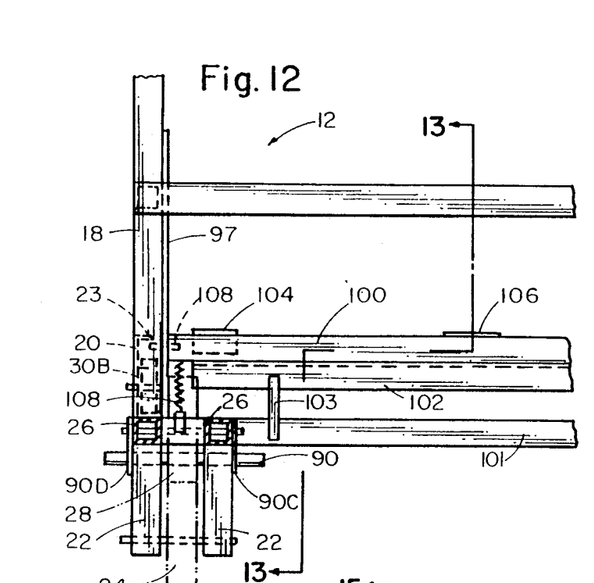
FIG. 12 is a rear elevational view of the latching apparatus that latches the tote to the retriever.
Figure 13:
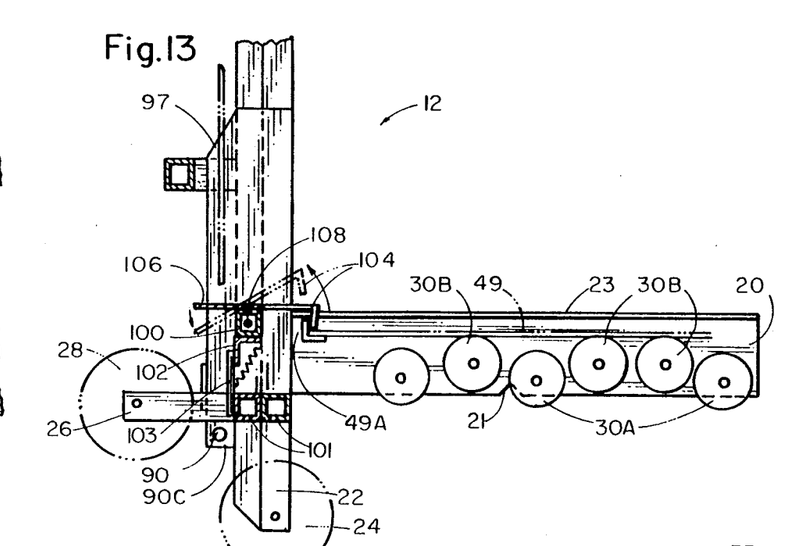
FIG. 13 is a sectional view taken along line 13—13 in FIG. 12.

Angle brackets 49A, 49A are secured to bracket 48 only at the front and rear sides thereof; these brackets are used to engage the tote to the retriever. As best shown in FIG. 13, trailing bracket 49A is engaged by a mating bracket 104 that depends from the leading edge of foot plate 106 when said foot plate 106 is in the position shown in solid lines. Note that foot plate 106 is pivotally mounted to retriever 12. When the foot plate is pivoted about axis 108, as shown in phantom lines, bracket 49A is disengaged and the retriever 12 and tote 40 may be separated. Foot plate 106 is fixedly secured to pivotally mounted cross bar 100 that interconnects legs 18, 18 of retriever 14, and said cross bar 100 is pivotally mounted about axis 108 by pivot pins 108, 108 at its opposite ends as best understood in connection with FIG. 12. An angle bracket 102 is fixedly secured to the bottom of said cross bar 100 and is accordingly pivotal therewith. Said bracket 102 is urged into abutting relation to upstanding pintle or stop member 103 by bias means 109 that interconnects cross bar 100 and a cross bar 101 that is positioned below cross bar 100 in parallel relation thereto. Thus, when foot plate 106 is in repose, bias means 103 holds it in a horizontal plane and bracket 102 abuts stop means 103 as best shown in FIG. 13. The operator of the novel assembly thus releases retriever 12 from tote 40 by stepping on foot plate 106 and causing it to pivot about axles 108, 108 so that the downturned part 104 of foot plate 106 disengages from angle bracket 49A of the tote. Note that downturned part 104 is slightly canted from the vertical to ensure facile disengagement of bracket 49A when the foot plate 106 is stepped upon. More importantly, said canting ensures that downturned part 104 will slide upwardly when it encounters bracket 49A when the retriever 12 is pushed forwardly to retrieve a tote from a trash compactor as will become more clear hereinafter, i.e., the slant causes the part 104 and hence foot plate 106 to rotate about axis 108 until bracket 49A is cleared, and bias means 109 then pulls the part 104 downwardly into mating engagement with bracket 49A, all in the absence of manipulation of said parts by the operator of the receiver.

It should be understood that foot plate 106 engages bracket 49A of the tote 40 when a tote is being removed from the compactor by receiver 12, as aforesaid, and that the tote is released by stepping on said foot plate only after the retriever has been reattached to the cart so that the tote can then roll atop caster wheels 56 toward the leading end of said cart. Where a cart having a three tote capacity is used, the foot pedal 106 will be released only when the first two totes are loaded, i.e., the third and final tote cannot roll forwardly and thus there is no reason to release it by stepping on said foot pedal.

Figure 14:
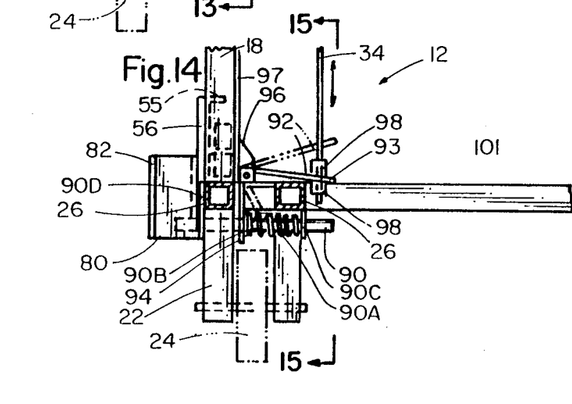
FIG. 14 is a rear elevational view of the latching apparatus that latches the retriever to the cart.
Figure 15:
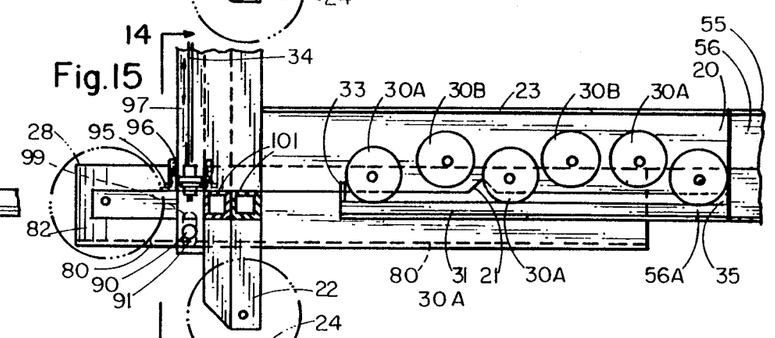
FIG. 15 is a sectional view taken along line 15—15 in FIG. 14.

FIGS. 14 and 15 depict the mechanism for detachably securing the retriever 12 to the cart 14. The tote latch mechanism of FIGS. 12 and 13 is omitted from FIGS. 14 and 15 to simplify them. For the same reason, the cart latching mechanism of FIGS. 14 and 15 is omitted from FIGS. 12 and 13.

Generally "L"-shaped bell crank 92 (FIG. 14) includes generally horizontal arm 93 and downwardly extending arm 94, and is pivotally mounted at its fulcrum by a pivot pin 95 (FIG. 15) having its opposite ends held by plates 96, 96 which are carried by brace 97.

Release rods 34 of cart latch release handle 32 extend through an aperture formed in arm 93 of the bell crank and are secured against movement relative thereto by a pair of collets 98, 98. Similarly, a slot 99 is formed in bell crank arm 94 (see FIG. 15) and said slot 99 receives latch bolt 90 therethrough, as best understood in FIG. 14. Latch bolt 90 is axially received within a coil spring 90A and said spring is positioned between stop plate 90C and a pin 90B. Thus, bolt 90 is urged outwardly at all times. i.e., to the left in FIG. 14. When so positioned, bolt 90 engages aperture 91 in extension member 56A (FIG. 1) to interlock the retriever 12 and the cart 14. Thus, to disconnect said retriever from said cart, latch handle 32 is displaced upwardly, i.e., it is squeezed against handle 16; legs 34 are integral therewith and the bell crank 92 is rotated accordingly, i.e., leg 94 of said bell crank bears against pin 90B and compresses spring 90A so that latch bolt 90 travels from left to right in FIG. 14. Thus it is understood that retraction of the looking bolts and the concomitant uncoupling of the retriever and cart is accomplished by the simple and easy manipulation of latch release handle 32.

No manipulation of latch handle 32 is required to latch the cart and retriever together; the retriever is simply rocked onto the cart and pushed forwardly in the manner described above, and the curved ends 82 of guide plates 80 (left side of FIG. 4) bear against their associated locking bolts 90 and compress the associated springs 90A until said locking bolts 90 align with their associated apertures 91, upon which alignment each spring urges its associated bolt into its associated locking aperture.

Figures 16, 17:
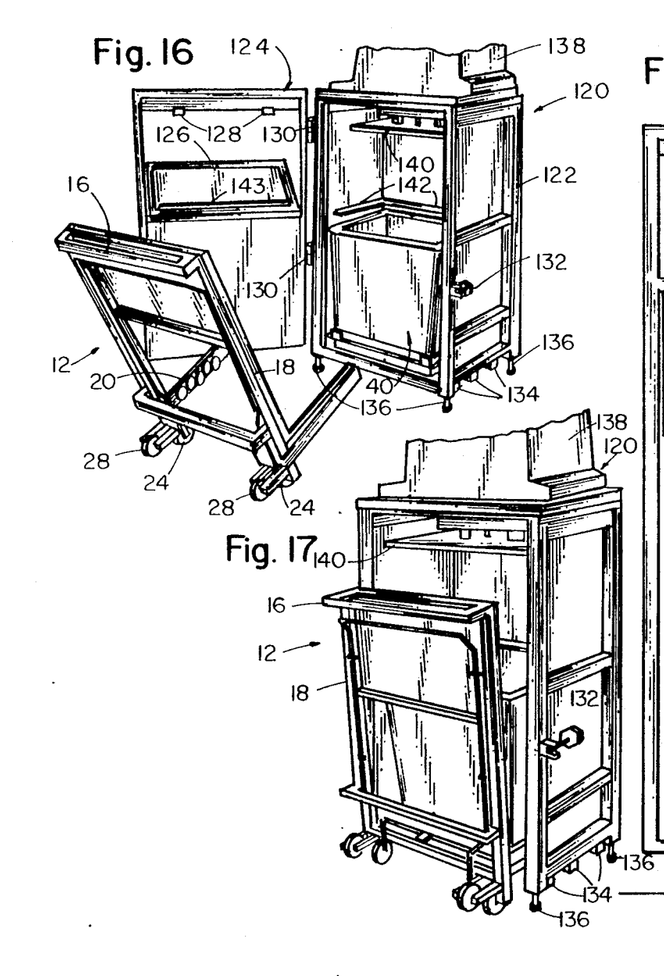
FIG. 16 is a perspective view of a trash compactor having its door swung open and the novel retriever disposed in front thereof preparatory to retrieving a tote from said compactor.
FIG. 17 is a perspective view of the compactor when the retriever is fully received therewithin to retrieve the tote.

FIGS. 16 and 17 show how the retriever 12 is used to retrieve a full tote 40 from a compactor 120. Note that arms 20 of retriever 12 are tilted upwardly and that the retriever is supported by wheels 24 and 28. Compactor 120 has a parallelepiped housing 122 and incudes door 124 hinged thereto as at 130. Door 124 includes a hinged flap 126 that enables trash to be inserted into the compactor without opening said door 124. A pair of laterally spaced latch retainers 128 releasably engage flap 126 to stop the flap from overtravel. Latch 132 on the housing 122 keeps door 124 shut and must of course be released by the retriever operator when the tote 40 is to be removed from said housing 122.

The floor of the compactor 120 is reinforced with a plurality of transversely disposed brace members 134 and adjustable legs 136 are provided so that the compactor may be stabilized relative to the floor upon which it sits.

The compactor motor is housed within motor housing 138 which surmounts housing 122. Said motor drives a hydraulic pump that drives a hydraulic cylinder to which is attached flat plate 140 that descends and compresses the contents of tote 40 when the motor is activated. Note deflection plate 142 that is positioned slightly above the uppermost rim of tote 40 and which is angled downwardly and inwardly with respect to the interior walls of the compactor housing 122; there are three of said plates, i.e., they are mounted on the back and side walls of said housing. They perform the function their name implies, i.e., trash tossed carelessly into the housing 122 will be deflected into tote 40 by said plates. A similar deflection plate 143 is provided at the lowermost edge of flap 126. Liquid carelessly splashed against the interior walls of the housing will also be guided into the tote by said deflection members.

Figure 18:
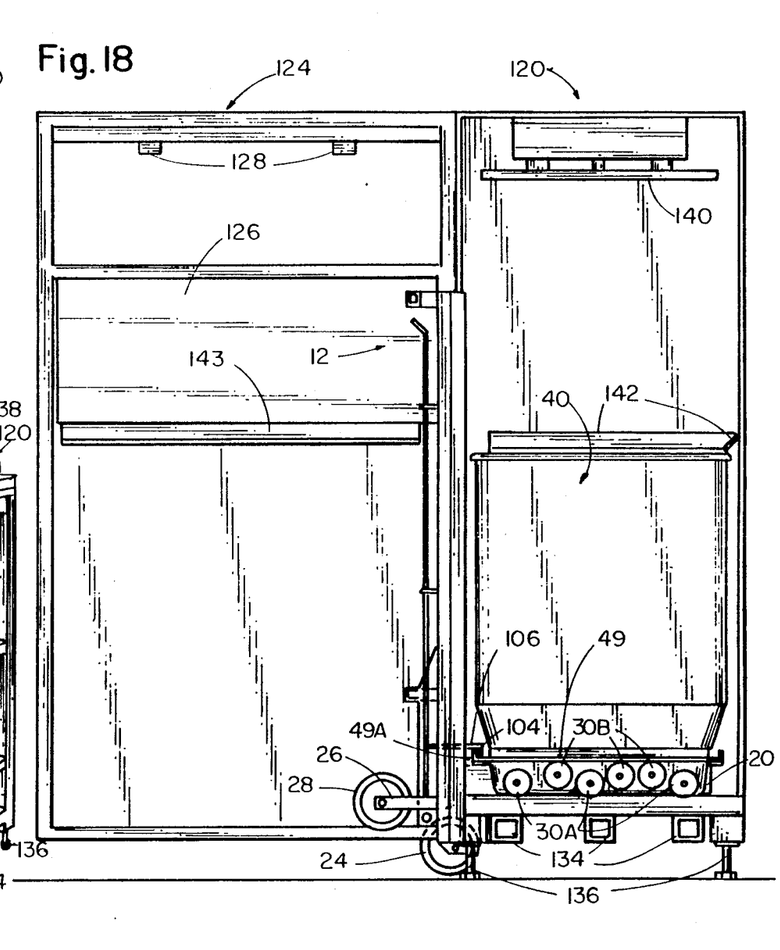
FIG. 18 is a side elevational view of the retriever fully received within the compactor.

Tote 40 simply sits atop the floor of housing 122 as depicted in FIG. 16. When the operator of retriever 12 reaches the housing 122, he or she tilts the retriever forwardly so that rear wheels 28, 28 are lifted from the support surface upon which the operator is walking; this action places arms 20 of the retriever in substantially parallel relation to said support surface and to the floor of the housing 122. The retriever is then rolled forwardly so that arms 20 enter housing 122 as depicted in FIGS. 17 and 18. As mentioned earlier, that action results in foot plate 106 being momentarily driven from its position of repose, i.e., in a counterclockwise direction in the view of FIG. 18, until its downwardly turned forward edge 104 clears bracket 49A. Upon clearing said bracket 49A, foot plate 106 then reassumes its position of repose, under the influence of bias means 109, and engages said bracket 49A and hence tote 40 as depicted in FIG. 18.

Lower caster wheels 30A will rotatably engage the floor of the housing 122 and the upper wheels 30B will rotatably engage bracket 49, as shown in FIG. 18. Said upper wheels 30B are mounted sufficiently elevated with respect to floor-engaging wheels 30A so that tote 40 is slightly lifted as the retriever 12 is pushed into housing 122. Since the weight of the tote (usually about one hundred pounds) is thereby transferred to the wheels 30B, the operator may then easily withdraw retriever 12 and the tote 40 from housing 122 in the substantial absence of physical exertion, i.e., the bottom of the tote will not scrape against the floor of the housing 122. Once the retriever and the tote it supports are retracted from the housing 122, the operator again rocks the retriever back into the position shown in FIG. 16 so that the tote may be easily transported to the nearby cart 14, also in the substantial absence of physical exertion.

Figure 19:
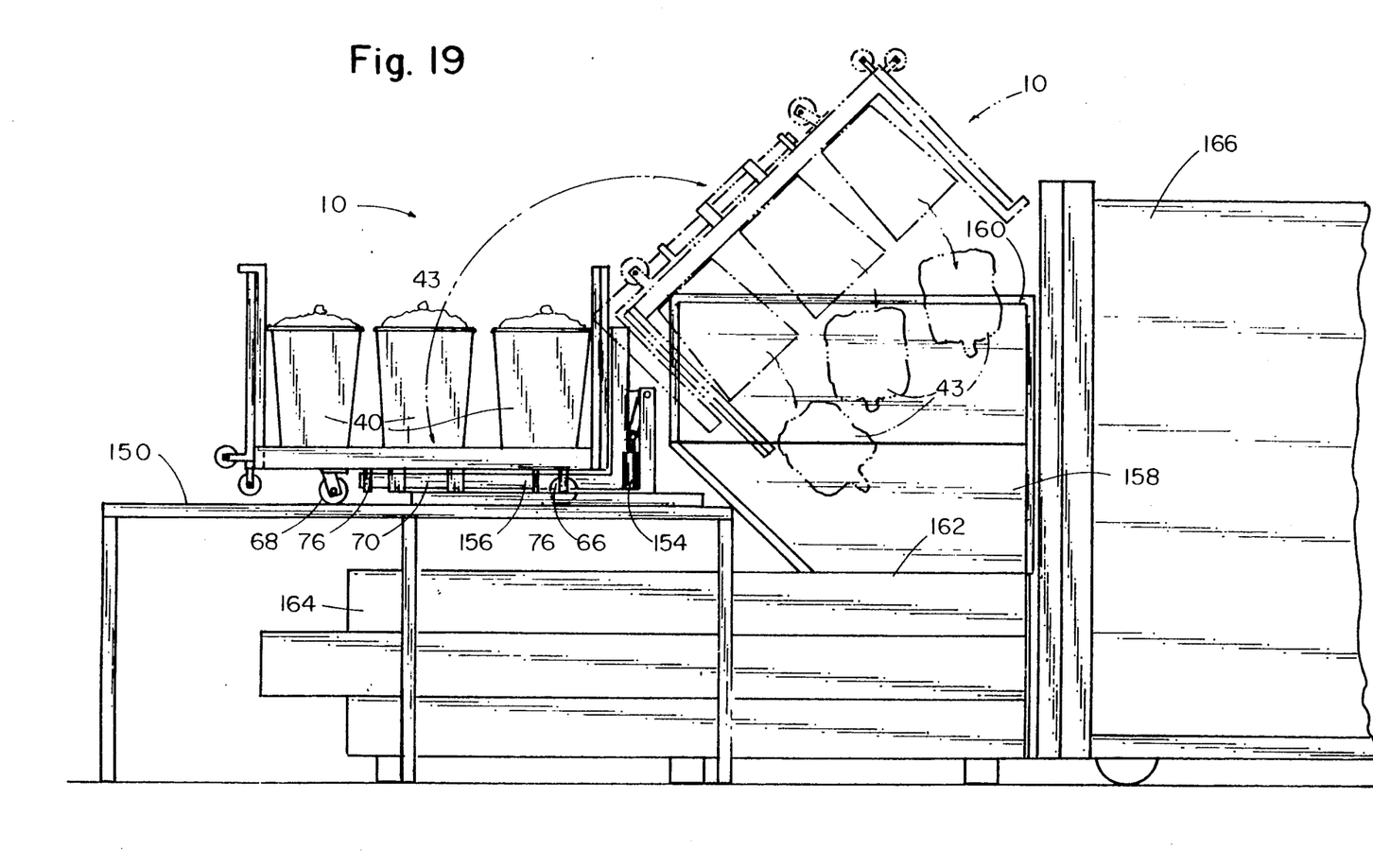
FIG. 19 is a side elevational view showing a full cart on a platform and showing how the totes are emptied in phantom lines.

In the embodiment illustrated in FIG. 19, a cart 14 accommodates three totes 40; of course, in view of this disclosure it is now obvious that carts having differing capacities could be provided. Retriever 12 and cart 14 are shown in their interconnected relationship, and the combined assembly 10 is shown supported atop a platform 150. Platform 150 also supports a fork lift mechanism 152 having cylinder 154 and forks 156 that are received by the guides 76 and open-ended box 70 mentioned earlier. As indicated in phantom lines, fork lift mechanism 152 lifts Trashporter 10 from platform 150 and pivots it as indicated by the double-headed directional arrow into a substantially inverted position. Plastic bags 143 which line totes 40 fall under the influence of gravity into hopper 158, having side walls 160, due to the tapered bottom of each tote 40 and the vacuum-defeating ribs 45 mentioned earlier. Bags 43 thus loosely collect in the bottom 162 of hopper 158. Accordingly, a secondary compactor is housed in housing 164 adjacent hopper 158 and serves to compress said bags tightly together. Upon said final compressing, the bags are loaded into a truck 166 by suitable means and hauled away.

Figures 20, 21:
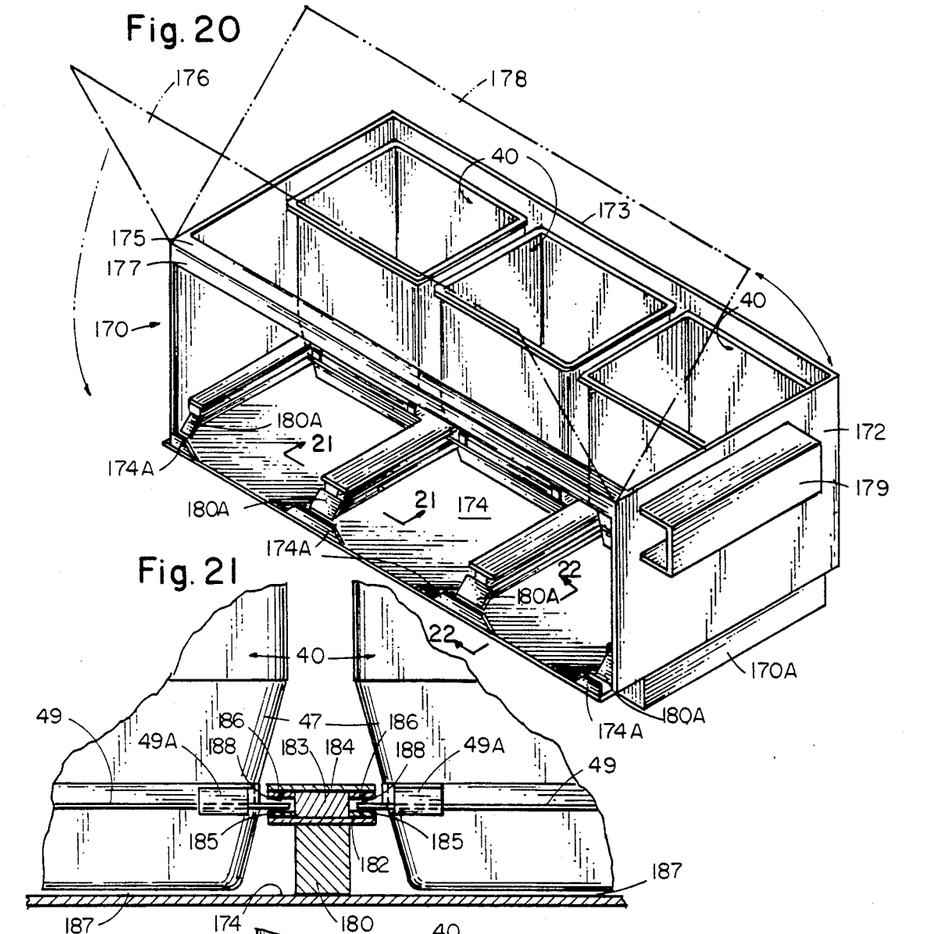
FIG. 20 is a perspective view of a dumpster having a six tote capacity.
FIG. 21 is a transverse sectional view of the tote-retention tracks that form a part of the dumpster of FIG. 20.

FIG. 20 shows a Dumpster trash receptacle 170 that has a conventional external appearance; it sits atop a base 170A and includes side walls 172, a back wall 173, and a floor 74. Its forward, upper corners are connected by an angle member having horizontal and vertical walls 175, 177, respectively. The front wall 176 and the top wall 178 of Dumpster 170 are hingedly mounted to said corner-connecting angle member and are shown in phantom lines. Channel members 179, only one of which may be seen in FIG. 20, are fixedly secured to each side wall 172, 172 and receive the forks of a front loading garbage truck so that Dumpster 170 may be lifted and inverted in much the same way as Trashporter 10 was lifted and inverted in FIG. 19.

Six totes 40 may be housed within this particular Dumpster 170, although different Dumpster sizes are of course within the scope of this invention. Only three totes are shown in FIG. 20 to better reveal its structure. Each tote is held within the Dumpster by track members that are secured to the floor 174 of the Dumpster; the structure of a track member is best shown in FIG. 21. Pedestal 180 is surmounted by flat plate 182; a spacer 183 surmounts the pedestal and another flat plate 184 overlies said spacer 183. Friction-reducing Nylon strips 185 and 186 overlie flat plate 182 and underlie flat plate 184, respectively; this creates an elongate slot 188 therebetween that slidingly accommodates outwardly extending lips 49 of the adjacent totes 40 so that each tote may be slid from the front of the Dumpster to the rear thereof with minimal frictional resistance. In view of this disclosure, it is also now obvious that a more expensive roller means could be employed in lieu of said sliding means.

Figure 22:
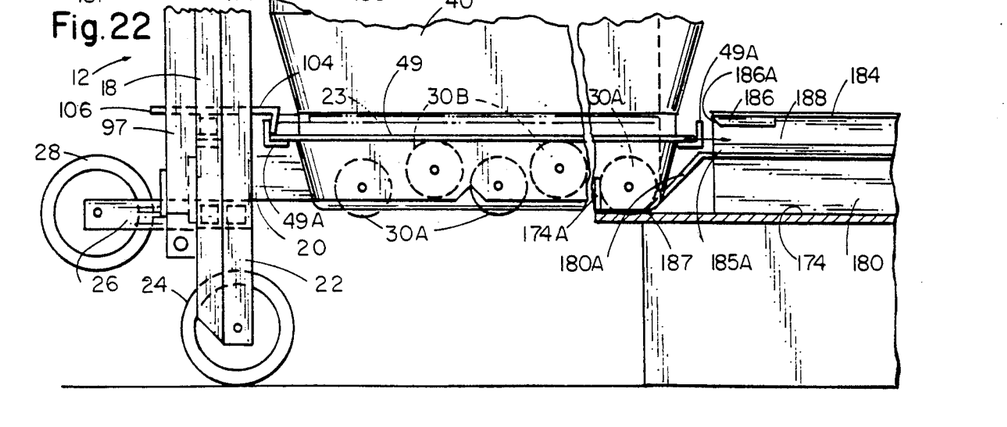
FIG. 22 is a side elevational view of the retriever and a longitudinal sectional view of said retention tracks.

Upper Nylon strips 186 may be discontinuous to save materials, as is apparent from FIG. 22, i.e., they may be spaced at longitudinally spaced intervals less than the extent of bracket 49, but lower strips 185 are preferably continuous as shown. Retriever 12 is rolled into position in front of Dumpster 170 in the same manner employed when it approaches compactor 120, and it is then tilted forwardly so that leading wheel 30A comes to rest atop floor 174 of the Dumpster as depicted in FIG. 22; this will generally align brackets 49 and slots 188 so that said brackets are slidingly received therein when the retriever is advanced on its rollers 24. A more specific alignment is provided by ramps 180A, as more fully set forth hereinafter. Note that the leading edge of Nylon strips 185 and 186 are beveled as at 185A, 186A, respectively, to ensure a smooth entry of brackets 49 into slots 188. The underside of each bracket 49 is rollingly engaged by upper rollers 30B so that the weight of the tote is supported by said rollers 30B. Note further the upstanding stop plates 174A secured to the leading edge of Dumpster floor 174; as perhaps best shown in FIG. 22, lead wheel 30A of the retriever is captured between its associated stop plate 174A and its associated ramp 180A. This arrangement holds the retriever against forward movement into the Dumpster when a tote 40 is slid thereinto; it also holds the retriever against rearward movement when an empty tote is being loaded thereonto from the Dumpster after the Dumpster has been inverted. It is the responsibility of the retriever operator to lower the front end of the retriever so that leading wheels 30A are so captured.

When the Dumpster is to be emptied, front wall 176 is latched shut, but top wall 178 is not so that it is free to swing about its hinges when the Dumpster is lifted and inverted. The engagement of slots 188 and brackets 49 holds totes 40 in the Dumpster when it is inverted, but bags 43 fall out into the garbage truck as desired due to the aforementioned structure of the totes.

Figure 23:
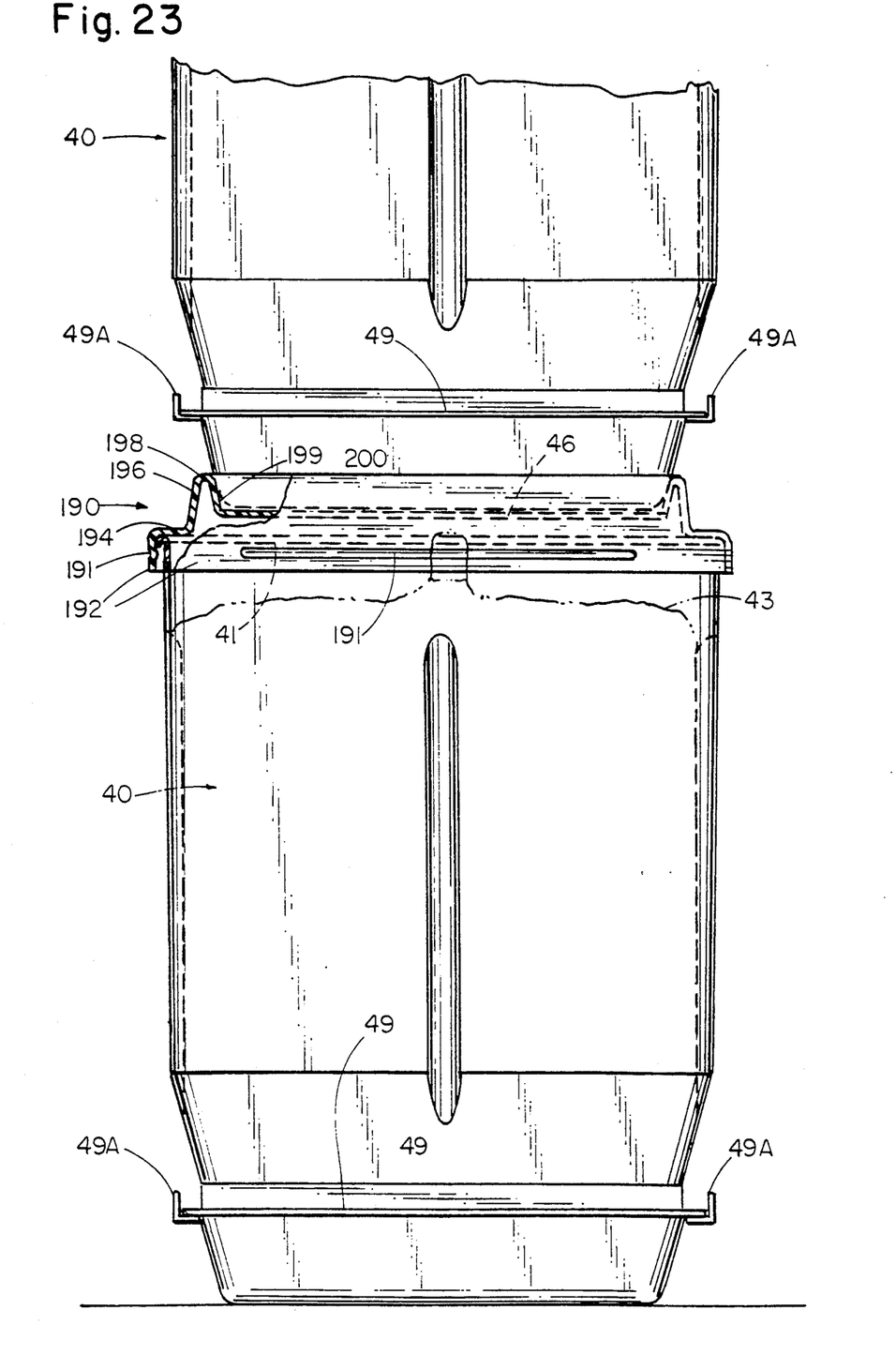
FIG. 23 is a side elevational view of a pair of stacked totes and includes a sectional view of a novel closure means that facilitates such stacking.

A final embodiment of the novel apparatus, shown in FIG. 23, includes a closure means 190. Said closure means has utility when red bags containing regulated medical waste are deposited in totes 40; in view of the possibility of disease transmission from contact with blood, totes 40 must be tightly closed when used for the disposal of said red bags. Advantageously, the novel closure means 190 also enables totes 40 to be vertically stacked as depicted in FIG. 23.

Lid 190 includes a peripheral depending skirt 192 having an elongate recess 191 formed in each of its four sides; these recesses snap fittingly engage outwardly and downwardly turned lip 41 formed at the rim of tote 40 as mentioned above. A horizontal ledge 194 is integral with the upper edge of said depending skirts; the innermost edge of each ledge is integral with a generally upstanding outer wall 196 that terminates in horizontal top wall 198 which in turn is integral with generally upstanding inner wall 199 that is integral with horizontal top wall 200. Top wall 200 supports the bottom wall 46 of a tote 40 stacked atop the lowermost tote as shown. Inner wall 199 is canted radially inwardly as shown to snugly receive the complementally canted lower end of tote 40 so that the stacked totes are securely nested. It should be observed that no stacking of totes is required to securely hold lid 190 in place; the stacking capability is an embellishment and is not required.

This invention is clearly new and useful. Moreover, it was not obvious to those of ordinary skill in this art at the time it was made, in view of the art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, What is claimed is:

1. A device for retrieving containers and for transporting them, comprising:
    a container having a flange extending from its opposite side walls;
    a manually-propelled retriever for retrieving from a predetermined location said container;
    said retriever including a pair of parallel, transversely spaced apart, forwardly extending arms, each of said arms engaging an associated flange of said container when said retriever retrieves said container;
    said retriever having wheels so that it is easily transported over a support surface;
    a manually-propelled cart having a frame upon which retrieved containers are deposited;
    said wheels of said retriever supporting said arms a first predetermined distance above said support surface when said retriever is unattached to said cart;
    said cart having wheels that support said frame a second predetermined distance above a support surface;
    first latch means for releasably attaching said retriever to said cart so that said retriever and cart are transportable as a unit;
    said second predetermined distance being greater than said first predetermined distance, said wheels of said retriever being suspended above said support surface when said retriever is attached to said cart;
    second latch means for latching said container to said retriever and for releasing said container when it is deposited upon said cart;
    said wheels of said retriever including a set of primary wheels that are in rolling engagement with a support surface only when said retriever is detached from said cart, a set of auxiliary wheels that rollingly engage said support surface only when said retriever is detached from said cart, said primary and auxiliary wheels being mounted in orthogonal relation to one another;
    said forwardly extending arms being disposed generally parallel to said support surface when said retriever is attached to said cart and which are disposed at an upwardly inclined, predetermined angle relative to said support surface when said primary and auxiliary wheels are rollingly engaged with said support surface;
    a notch formed at a preselected location on an underside of each of said forwardly extending arms;
    said frame of said cart having a pair of longitudinally extending, transversely spaced apart frame members, an upstanding pintle member being fixedly secured to each of said frame members at a predetermined location, said retriever being pivotal about said pintle members when said notches pivotally engage said pintle members so that attachment of said retriever and cart is accomplished in part by pivotally rotating said retriever into engagement with said cart whereby neither the retriever nor a container carried thereby need be lifted when said reattachment is performed;
    said retriever further including a transversely disposed handle, a pair of handle support members depending from opposite ends of said handle, said forwardly extending arms of said retriever being fixedly secured to said handle support members near a lowermost end thereof in orthogonal relation thereto; and
    said first latch means including a movably mounted latch release handle disposed in parallel and closely spaced relation to said handle.

2. The device of claim 1, wherein said second latch means includes a foot plate that is pivotally mounted to said retriever, wherein a container has secured thereto a bracket engageable by said foot plate, wherein a bias means urges said foot plate into retaining relation with said bracket so that said foot plate retains said container when said bias means is in response and releases said container when said bias means is loaded, said loading of said bias means being accomplished by pivoting said foot plate from its position of repose, and wherein said foot plate has a leading edge that is specifically configured so that it is displaced by said bracket when pushed thereagainst so that said container is attachable to said retriever by pushing said retriever and its foot plate against said container bracket in the absence of foot pedal operation.

3. The device of claim 1, further comprising a locking aperture formed in each of said cart frame members adjacent a retriever end of said cart, a complemental locking aperture formed in a lowermost part of said retriever, a biased locking bolt, associated with each of said locking apertures, that is biased to extend through its associated locking aperture to interlock said retriever and cart when said locking bolts are in repose, and means for retracting said locking bolts against an associated bias means when said latch release handle is activated.

4. The device of claim 3, wherein said means for retracting said locking bolts includes a pair of pivotally mounted bell cranks each of which has a fulcrum and a pair of angularly disposed arms, wherein said movably mounted latch release handle has a pair of elongate support members that depend from its opposite ends, wherein each of said support members are fixedly secured to a predetermined first arm of an associated bell crank, and wherein a predetermined second arm of each bell crank bears against its associated bias means and compresses it when said bell crank is pivoted.

5. The device of claim 4, further comprising a curved wall positioned at the retriever end of each of said cart frame members, each of said curved walls slidingly engaging its associated locking bolt and driving said locking bolt against its bias means to retract it when said retriever is brought into engagement with said cart so that attaching said retriever to said cart is accomplished in the absence of manipulation of said latch release handle.

6. The device of claim 1, wherein said retriever includes a handle member, said pair of parallel, transversely spaced apart arm members being fixedly secured to said handle member near a lowermost end thereof in a predetermined fixed angular relation thereto, wherein a first set of wheels is rotatably mounted on an inboard side of each of said arm members, each wheel of said first set of wheels rotatably engaging a support surface when said retriever is attached to said cart and when said retriever is engaged to a container to be retrieved, wherein a second set of wheels is rotatably attached to said inboard side of said arm members in upwardly spaced relation to said first set of wheels, and wherein said second set of wheels rollingly engages an associated flat flange when said retriever is in engagement with said container.

7. The device of claim 6, further comprising means for capturing said flat flanges when said container is supported by said cart, said means for capturing being a structural part of said cart, said cart including a pair of side frame members of I-beam construction and each of said side frame members including a lip under which said flat flanges are positioned when said containers are loaded onto said cart, said lips enabling said device to be inverted while still retaining said containers on said cart.

8. The device of claim 7, further comprising a set of rollers rotatably mounted on an inboard side of said side frame members, said rollers being engaged by said flat flanges when said containers are loaded onto said cart.

9. A device for retrieving containers and for transporting them, comprising:
a retriever for retrieving containers from a predetermined location; 'said retriever having wheels so that it is easily transported over a support surface;
a cart upon which retrieved containers are deposited;
said cart having wheels so that it is easily transported over a support surface;
a first latch means for releasably connecting said retriever to said cart so that said retriever and cart are transportable as a unit;
a second latch means for latching and unlatching a container to and from said retriever, respectively, to facilitate retrieval of said container;
said retriever having a set of primary and a set of auxiliary wheels that are in rolling engagement with a support surface when said retriever is detached from said cart and which are suspended above said support surface when said retriever is attached to said cart;
said primary and said secondary wheels being disposed at a predetermined angular relation to one another;
said retriever having a pair of transversely spaced apart, forwardly extending arms disposed generally parallel to a support surface when said retriever is attached to said cart and said arms being disposed obliquely to said support surface when said retriever is unattached to said cart;
a notch formed on an underside of each of said arms;
said cart including a frame having a pair of longitudinally extending, transversely spaced apart frame members, an upstanding pintle member fixedly secured to each of said frame members at a predetermined location;
said retriever being pivotal about said pintle members when said notches pivotally engage their associated pintle members whereby attachment of said retriever to said cart is accomplished in part by pivotally rotating said retriever into engagement with said cart so that neither said cart nor a container carried by said cart need be lifted when said cart is attached to said retriever;
said retriever further including a transversely disposed handle, a pair of handle support members depending from opposite ends of said handle, said forwardly extending arms being fixedly secured to said handle support members near a lowermost end thereof in orthogonal relation thereto; and
said first latch means including a movably mounted latch release handle disposed in parallel and closely spaced relation to said handle.

10. The device of claim 9, further comprising a locking aperture formed in each of said cart frame members adjacent a retriever end of said cart, a complemental locking aperture formed in a lowermost part of said retriever, a biased locking bolt, associated with each of said locking apertures, that is biased to extend through its associated locking aperture to interlock said retriever and cart when said locking bolts are in repose, and means for retracting said locking bolts against an associated bias means when said latch release handle is activated.

11. The device of claim 10, wherein said means for retracting said locking bolts includes a pair of pivotally mounted bell cranks each of which has a fulcrum and a pair of angularly disposed arms, wherein said movably mounted latch release handle has a pair of elongate support members that depend from its opposite ends, wherein each of said support members are fixedly secured to a preselected first arm of an associated bell crank, and wherein a preselected second arm of each bell crank bears against its associated bias means and compresses it when said bell crank is pivoted.

12. The device of claim 11, further comprising a curved wall positioned at the retriever end of each of said cart frame members, each of said curved walls slidingly engaging its associated locking bolt and driving said locking bolt against it bias means to retract it when said retriever is brought into engagement with said cart so that attaching said retriever to said cart is accomplished in the absence of manipulation of said latch release handle.

* * * * *